United States Patent
Huang et al.

(10) Patent No.: US 7,120,702 B2
(45) Date of Patent: Oct. 10, 2006

(54) SYSTEM AND METHOD FOR TRANSCODING WEB CONTENT FOR DISPLAY BY ALTERNATIVE CLIENT DEVICES

(75) Inventors: Anita Wai-Ling Huang, San Francisco, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 09/798,246

(22) Filed: Mar. 3, 2001

(65) Prior Publication Data

US 2002/0133569 A1    Sep. 19, 2002

(51) Int. Cl.
    G06F 15/16    (2006.01)
(52) U.S. Cl. ............... 709/246; 709/217; 709/219; 706/45; 706/46; 706/47
(58) Field of Classification Search ........ 709/201–204, 709/217–219, 224–226, 240–249, 231; 715/744, 715/746; 706/45–47
    See application file for complete search history.

(56) References Cited

U.S. PATENT DOCUMENTS

| 5,867,153 | A | * | 2/1999 | Grandcolas et al. ........ 709/217 |
| 5,918,013 | A |   | 6/1999 | Mighdoll et al. |
| 5,996,022 | A |   | 11/1999 | Krueger et al. |
| 6,247,048 | B1 | * | 6/2001 | Greer et al. ................. 709/219 |
| 6,407,680 | B1 | * | 6/2002 | Lai et al. ....................... 341/50 |
| 6,421,733 | B1 | * | 7/2002 | Tso et al. .................... 709/246 |
| 6,704,798 | B1 | * | 3/2004 | Mogul ......................... 709/246 |
| 6,826,597 | B1 | * | 11/2004 | Lonnroth et al. ........... 709/246 |

OTHER PUBLICATIONS

Transcoding Internet Content for Heterogeneous Client Devices; Smith, Mohan and Li; IEEE Explore; 1998.*
XML: Data's Universal Language; Roy and Ramanujan; IT Pro; May|Jun. 2000; pp. 32-36.*
PUBLICATION: "Aurora: A Conceptual Model For Web-Content Adaptation To Support The Universal Usability Of Web-Based Services". Anita W. Huang, Neel Sundaresan.

* cited by examiner

*Primary Examiner*—John Follansbee
*Assistant Examiner*—Mohammad Siddiqi
(74) *Attorney, Agent, or Firm*—John L. Rogitz

(57) ABSTRACT

A computer-implemented method and system for processing transactions between a client device and a web page. The system includes an adapter for receiving and interpreting a request from the client device, wherein the adapter is configured to interface with the client device. A generator retrieves a web page specified by the request. A transcoder receives the retrieved web page and applies a transcoding rule to extract data from the web page. The transcoding rule used is one of a set of predefined rules relating to the web page. The transcoder also transforms the data into a standardized form so that the adapter can then modifying the standardized data into a compatible form for display by the client device. Therefore, web based transactions can be performed by a variety of client devices, including portable, wireless and voice-based devices.

21 Claims, 7 Drawing Sheets

```
<!ELEMENT make-bid (item) >

<!ELEMENT item ( description,
                 statistics,
                 input-bid)>

<!ELEMENT description EMPTY >

<!ELEMENT statistics EMPTY >

<!ELEMENT input-bid (confirm-bid) >

<!ELEMENT confirm-bid ( bid confirmation) >

<!ELEMENT bid-confirmation EMPTY >
```

```
<make-bid>
  <item>
    <link-description
      href="http://www.ebay.com/item?3456"
      rule=http://ara/rules/ebay/description.xml/>
    <link-statistics
      href="http://www.ebay.com/item?3456"
      rule=http://ara/rules/ebay/statistics.xml/>
    <link-input-bid
      href="http://www.ebay.com/item?3456"
      rule=http://ara/rules/ebay/input-bid.xml/>
  </item>
</make-bid>
```

FIG. 6

SYSTEM AND METHOD FOR TRANSCODING WEB CONTENT FOR DISPLAY BY ALTERNATIVE CLIENT DEVICES

BACKGROUND OF THE INVENTION

1. Field of the Invention

The present invention relates generally to techniques for transcoding web content, and more particularly to systems and methods for transcoding clusters of web pages to enable access to web services from a variety of client devices.

2. Description of the Related Art

There is a rapidly increasing use of the Internet for commercial and non-commercial transactions. These transactions allow a user to use and access the products or services offered by a web site. These interactions generally take place by the use of graphical forms that allow a user to receive and submit information. The use of these interactive graphical forms for transactions has generally required the use of conventional display screens for viewing the graphical content.

Increasingly, pervasive devices such as Personal Digital Assistants (PDAs), hand held computers, smart phones, TV browsers, wearable computers and mobile devices are gaining access to the Internet and other multimedia-rich information sources. However, the capacity of these devices to receive, store and display Internet content varies widely. For example, the graphical content of web pages cannot easily be viewed by voice-only interactions, nor by the small displays built into portable devices. As a result, many of these alternative devices cannot be used for certain types of web-based transactions.

To enable universal access in the coming age of pervasive computing, systems are being developed that tailor the content of web pages for pervasive computing devices. This tailoring process is called transcoding. The transcoding system adapts video, images, audio and text to the individual pervasive devices using a framework that allows the content to be summarized, translated and converted, on-the-fly.

One area where there is a need for transcoding systems is in web-based transactions. Conventional web pages require interaction with clusters of web pages to gain access to products and services being offered. For example, companies like e Bay, Yahoo!, and On sale, provide web-based auction services, and Amazon and Barnes & Noble act as on-line booksellers. The way that consumers access these services is through sets of interrelated web pages. These web pages typically include text and form controls through which the user retrieves information and enters input to communicate with the service-provider. For example, on an e-Commerce site, a user clicks on a hyperlink to select an item for purchase and receives a web page containing a form element to enter her credit-card information. She inputs her credit-card information and receives another form to enter her slipping address, etc. These kinds of multi-step transactions are necessary for a user to obtain web products or services.

Currently web pages, which are typically written in Hypertext mark-up language (HTML), are designed solely for display by devices using conventional graphical browsers, such as Netscape Navigator or Internet Explorer. Usually, when a user attempts to access these pages by voice or a small-screen device, the page loses both meaning and functionality. Consequently, users of such devices find it difficult or impossible to obtain the information and services provided by existing web pages.

One approach to adapting web data for more efficient display and interaction through alternative client devices, has been to find a general solution that handles all web content by concentrating on syntactic translations from one medium to another. One example of this approach is the IBM Infopyramid model, which consists of different classes that deal with different media types. (See http://www.re-search.ibm.co,/networked_data_systems/transcoding/index/html) Since HTML pages do not separate content from representation, however many transcoding systems result in translations that result in loss of meaning or functionality. In particular, navigation through visual information is aided by the page layout. Through a quick glance, a visually oriented user with a fullsized view of the image is easily able to find a piece of information embedded in an HTML page. By voice (which is serial), or by looking at fragmented sections of the page, a user will experience more difficulty. Since HTML does not provide support for computer programs to interpret the function and meaning of data segments, translation programs face the challenge of how to organize and meaningfully render the raw data.

In view of these considerations, a system and method to transcode web content in a semantic context is needed. A system is also needed that can anticipate a user's needs to generate a concise, but semantically sound, rendering of web content.

The present invention has carefully considered the above problems and has provided the solution set forth herein.

SUMMARY OF THE INVENTION

A system and computer-implemented, method is disclosed for enabling various client devices to process information from web sites. The invention may be used to process and intelligently return one web page, or a series of web pages. In one aspect of the invention, a method is provided for processing transactions between a client device and a web site by configuring at least one adapter unit to interface with the client device and defining a plurality of web page transactional domains, the steps performed by transactions in each transactional domain, and a set transcoding rules relating to each transactional domain. When a request is received from a client device, the request is interpreted by the adapter. The request is for a web page that enables transactions in one of the defined transactional domains. A previously defined transcoding rule that corresponds to the transactional domain of the web page is then used to extract data from the web page. The extracted data is then transformed into a standard form. The standard form of the extracted data is then modified to enable its display by the client device.

In another aspect of the invention, a system for processing transactions between a client device and a web page includes an adapter for receiving and interpreting a request from the client device, wherein the adapter is configured to interface with the client device. A generator retrieves a web page specified by the request. A transcoder receives the retrieved web page and applies a transcoding rule to extract data from the web page. The transcoding rule used is one of a set of predefined rules relating to the web page. The transcoder also transforms the data into a standardized form so that the adapter can then modifying the standardized data into a compatible form for display by the client device. Therefore, web based transactions can be performed by a variety of client devices, including portable, wireless and voice-based devices.

The details of the present invention, both as to its structure and operation, can best be understood in reference to the accompanying drawings, in which like reference numerals refer to like parts, and in which:

BRIEF DESCRIPTION OF THE DRAWINGS

FIG. 6 shows three XML link node data structures constructed from the data in a downloaded web page according to an embodiment of the invention.

DETAILED DESCRIPTION OF THE PREFERRED EMBODIMENTS

Figure 1:
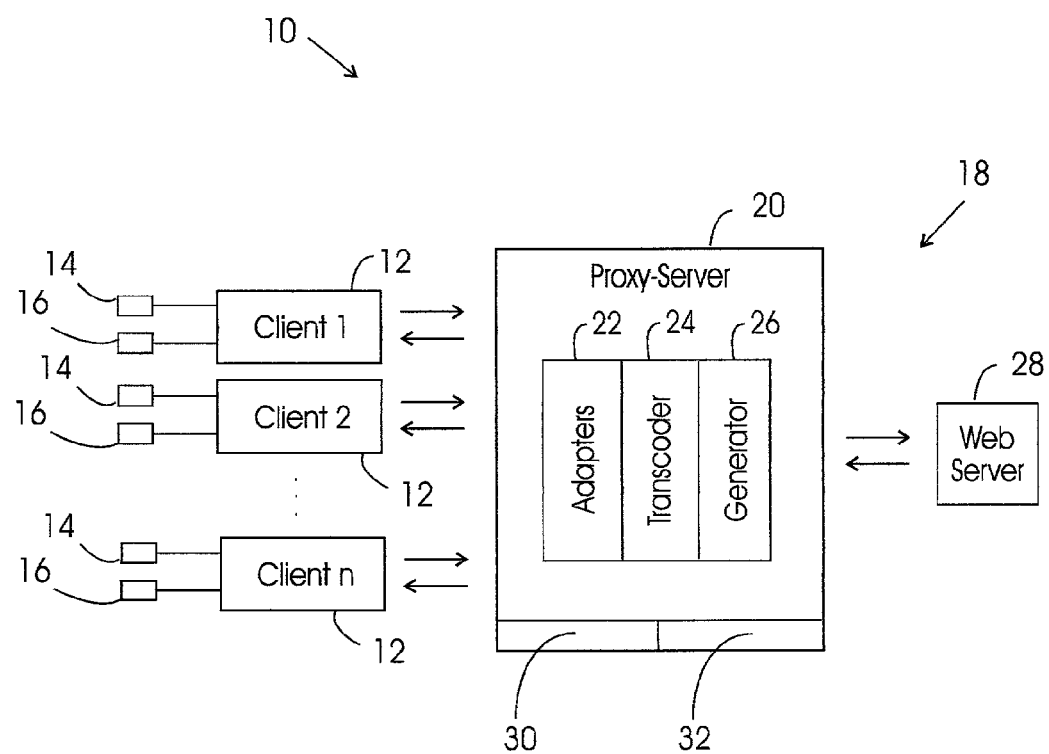
FIG. 1 is a block diagram of the overall architecture of the present system.

Referring initially to FIG. 1, a transcoding system is shown, generally designated 10, for enabling a user to access web pages and conduct transactions over the Internet. As shown, the transcoding system 10 can include one or more client devices 12, which include a respective input device 14, such as a keyboard and/or voice input, and an output device 16, such as a monitor, printer, other computer, or computer network.

The client device 12 can be any one of a variety of devices, such as a desktop personal computer made by International Business Machines Corporation (IBM) of Armonk, N.Y. equipped with IBM Homepage Reader, or other digital processors, such as a palm-pilot equipped with a Wireless Markup Language (WML) browser, a phone equipped with a visual display and/or a voice browser, a laptop computer equipped with Internet Explorer 5, mainframe computer, or any other suitable processing apparatus. Likewise, other input devices, including point and click devices, keypads, trackballs, and voice recognition devices can be used, as can other output devices.

The client device 12 accesses a computer network, such as the Internet 18, and transmits requests to a proxy-server 20, which in turn sends requests to a web server 28. In a preferred embodiment, the client device 12 sends a Hyper-Text Transfer Protocol (HTTP) request that specifies a Uniform Resource Locator (URL) to the proxy-server 20. The proxy-server includes adapters 22, transcoder 24, a generator 26, and a CPU 30, which are discussed in detail below. For each type of client device 12, or user preference, a corresponding adapter 22 is used to interpret the user request and properly transcode the relevant web content. In the preferred embodiment, the transmitted URL identifies which adapter to use.

In any case, the client device 12 accesses the proxy-server 20, which undertakes the logic of the present invention, which may be executed by a processor in the proxy-server 20 as a series of computer-executable instructions. The instructions may be contained on a data storage device 32 in the proxy-server 20 with a computer readable medium, such as a diskette having a computer usable medium with code elements stored thereon. Or, the instructions may be stored on random access memory (RAM) of the proxy-server 20, on a DASD array, or on magnetic tape, conventional hard disk drive, electronic read-only memory, optical storage device, or other appropriate data storage device.

Figure 5:
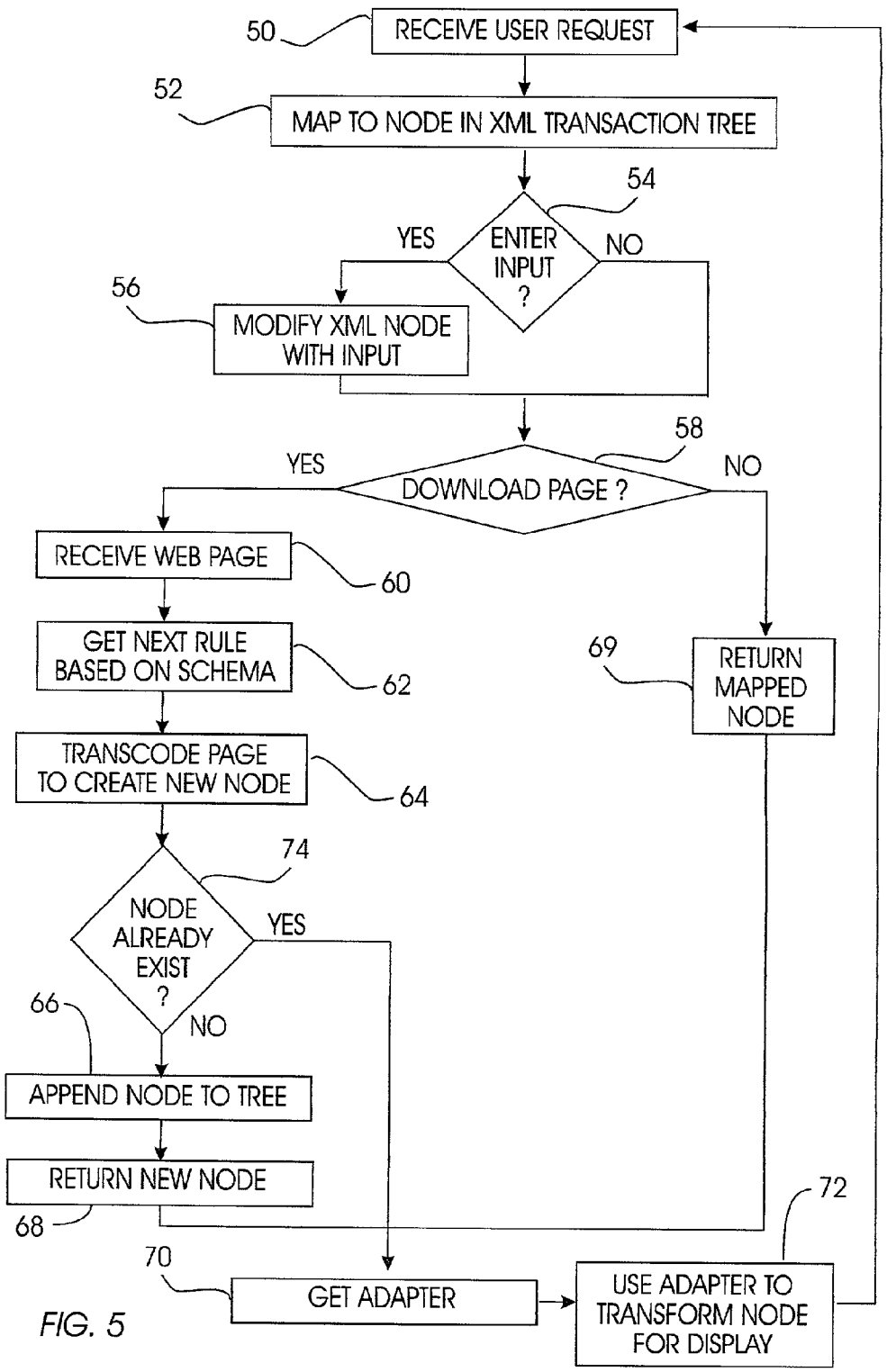
FIG. 5 shows a flow chart of the process of interpreting the transaction exemplified in FIG. 4.

Furthermore, the flow chart in FIG. 5 herein illustrates the structure of the logic of the present invention as embodied in computer program software. Those skilled in the art will appreciate that this flow chart illustrates the structure of computer program code elements, including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Each adapter 22 interprets a client-request and translates it into a system request. In a preferred embodiment, the system request takes the form of an XML fragment within an XML document. The generator 26 interprets the system request and sends a request to a web server 28 for a specified web page on the Internet 18. The transcoder 24 receives the downloaded page and the original system request and retrieves an appropriate transcoding rule for the web page. The transcoder 24 uses this rule to extract data from the web page and to transform the web page into a standardized form. Each rule may be applied to a plurality of web pages on a given web site. In a preferred embodiment, the transcoder 24 transforms the web page into the form of an XML fragment. The appropriate adapter 22 receives the standardized data and further transforms it for display according to the requirements of its corresponding client-agent and/or user preferences e.g. WML, text-only HTML, etc.

Figure 2A:
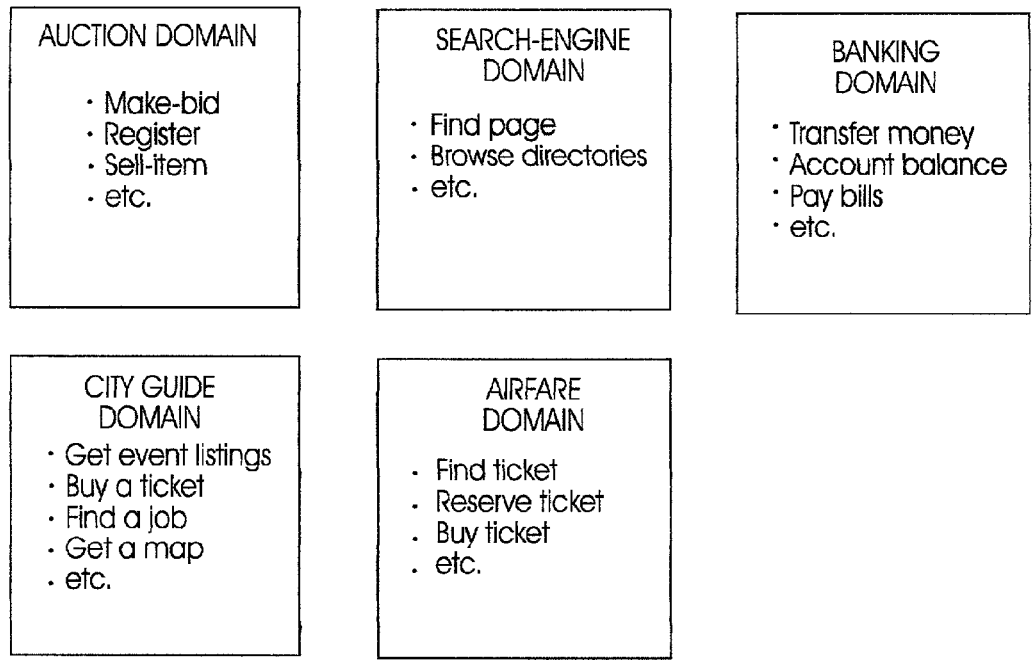
FIG. 2A is a diagram of the categories of various service domains commonly found in web sites.

Referring now to FIG. 2A five examples of web service domains are shown: the auction domain, the search engine domain, the banking domain, and the airfare domain. Web sites in each of these domains performs particular services. For example, an auction domain web site performs services that include making bids, registering and selling an item. In a preferred embodiment of the invention, web pages are categorized into one of a plurality of service domains and their associated services, including those shown in FIG. 2A. The transcoding system 10 interprets web content according to one of a predefined set of service domains.

Figure 2B:
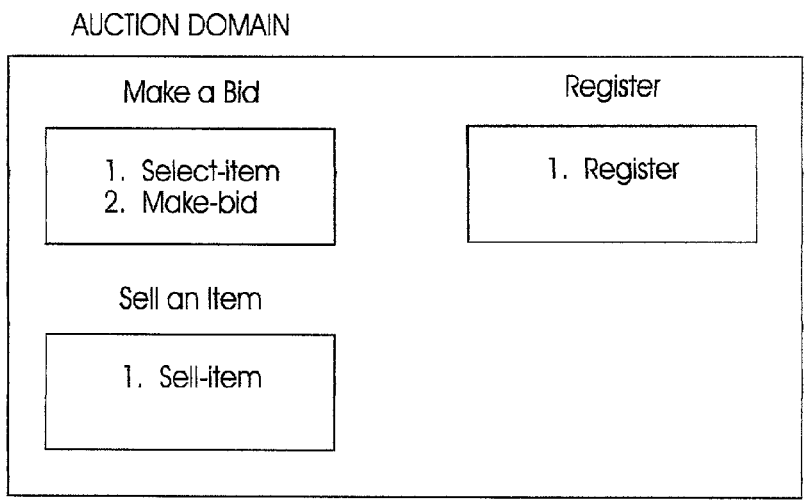
FIG. 2B is a diagram of an auction service domain broken down into its component services obtained by specific transactions according to an embodiment of the invention.

FIG. 2B shows one possible service domain, the auction domain. Each service provided by the auction domain is comprised of one or more multi-step transactions. In particular, the "make a bid" service includes the "select-item" and "make bid" transactions. The register service includes a "register" transaction. The "sell an item" service includes the "sell-item" transaction. These groups of transactions, which define a service domain, are referred to as "transaction clusters".

Figures 2C, 2D:
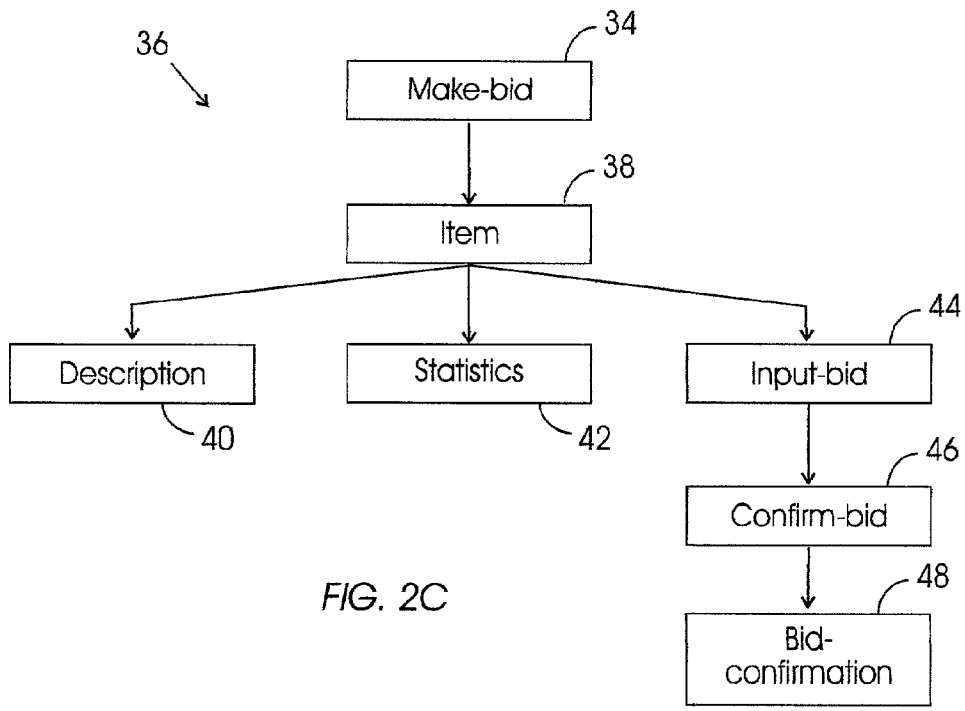
FIG. 2C is a chart illustrating how the steps of a transaction are defined according to an embodiment of the invention.
FIG. 2D is an XML schema that formalizes the steps of a transaction according to an embodiment of the invention.

FIG. 2C shows additional details of the "make-bid" transaction 34. This breakdown of the individual steps of a transaction is represented as a "transaction schema" 36. Each box in the transaction schema 35 in FIG. 2C corresponds to a component on a web page that enables a user to conduct the transaction. For example, the item box 38 corresponds to an item-page, the description box 40 corresponds to the item-description on the item-page, etc. Moreover, as a user proceeds through a multi-step transaction, she moves from step to step according to the transaction schema 36. Thus, the user at an item page may select to proceed to the statistics step 42, or to the input-bid step 44, and then to the confirm-bid step 46 and then to the bid-confirmation step 48.

FIG. 2D shows an example of a transaction schema formalized as an XML Document Type Definition (DTD) in accordance with a preferred embodiment of the invention. A DTD is a type of XML schema, which consists of the definition of the content used in an XML document. The DTD represents each step of the transaction as an XML fragment type definition. Through these definitions the DTD describes the order in which each step occurs by using the XML grammar to dictate the order in which each fragment is allowed to appear and the fragment content (text attributes, and other non-transaction XML fragments) associated with each transaction step. For example, the description contains the text that describes the item. These transactions constitute the semantic framework through which the system transcodes the web content in accordance with the invention. This aspect of the invention comprises a novel functional way of analyzing the content of multiple, related web pages.

Figure 3A:
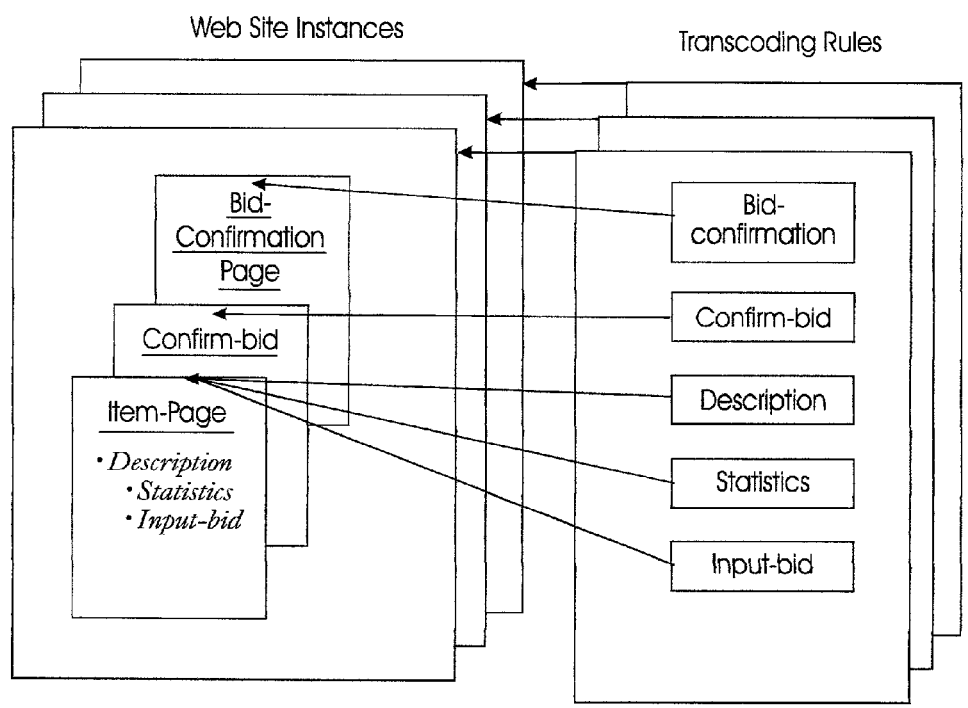
FIG. 3A shows a diagram illustrating the relationship between sequences of web pages and sets of transcoding rules for a given transaction according to an embodiment of the invention.

In accordance with the invention, each step of a transaction corresponds to a web page component. FIG. 3A shows the relationship between transcoding rules and web pages. For each step in a transaction, which is described by a transaction schema, the transcoding system 10 maintains a separate transformation rule. Each of these transformation rules is written for a specific web page template for a web site instance. In addition, each rule may apply to a large number of web pages on a given web site. These rules specify how to extract and transform the target data from the associated pages. For example, in a preferred embodiment of the invention, the transcoding system 10 maintains one description rule that applies to pages that conform to the eBay item page format. This particular rule specifies how to locate the web content in the eBay pages that constitute the item-description and how to transform that content into the standardized XML form. As illustrated in FIG. 3A, the transcoding system 10 maintains a set of these transaction rules for each instance of a web site. Hence, for each auction site instance (e.g. Yahoo!, eBay, OnSale), the system 10 maintains a unique set of transformation rules that correspond to the auction transaction.

In a preferred embodiment of the invention, the pattern-matching tool PatML is used by the transcoder 24. PatML is a pattern/match replacement tool for XML documents, which allows a user to specify how an XML document can be transformed for browsing on other programs. A PatML rule specifies an XML pattern to match and how to transform the pattern. In one embodiment, each PatML rule matches a specific pattern in an HTML page and transforms this pattern into a new XML fragment.

Figure 3B:
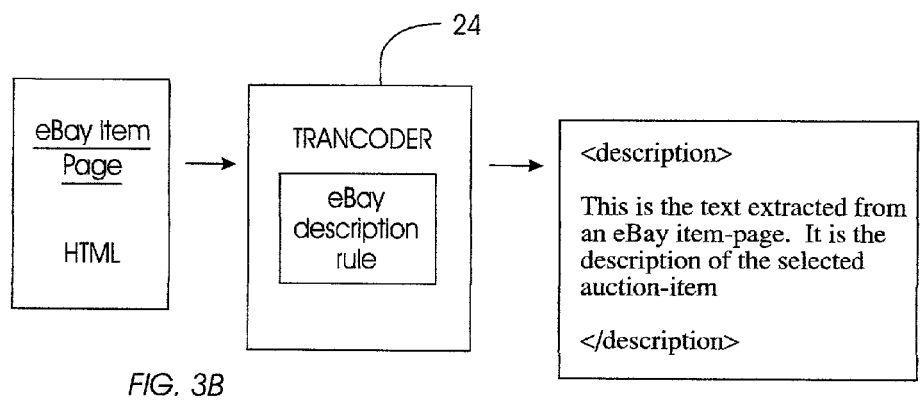
FIG. 3B shows a diagram illustrating how a transcoding rule is applied to interpret web data according to an embodiment of the invention.

FIG. 3B shows how the transcoder 24 transforms the data from a specific HTML page into an XML fragment that conforms to specifications in the transaction DTD. With the advent of Extensible HTML (XHTML), the transcoding system 10 may use XHTML annotations to web data to aid in this data extraction and transcoding. XHTML is a single format combining HTML 4.0 and XML 1.0. The transaction framework of the present invention may be used as a way to annotate web data for accessibility.

Figure 4:
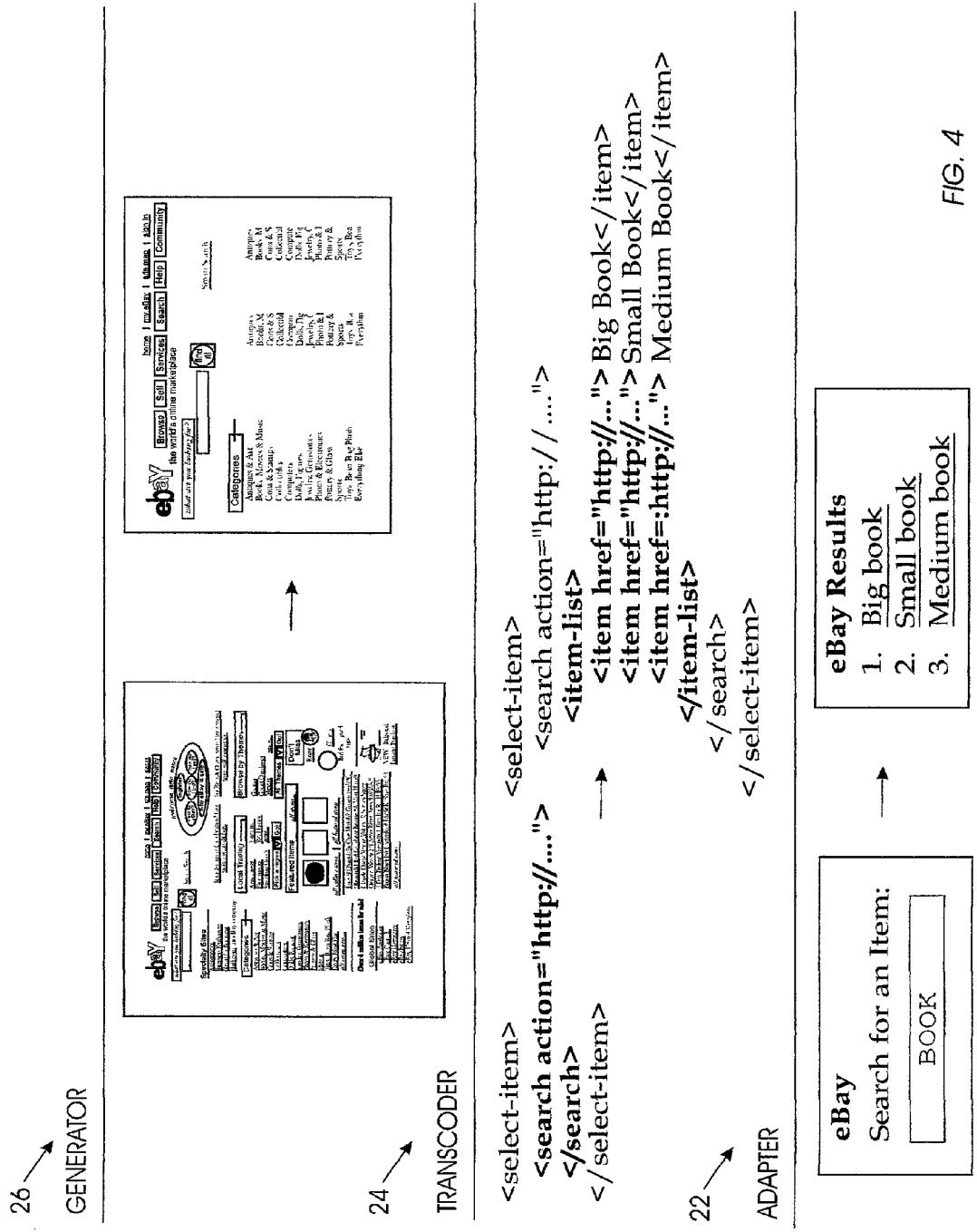
FIG. 4 is shows a diagram illustrating the process of interpreting a transaction by generating an XML document according to an embodiment of the invention.

FIG. 4 shows how the transcoding system 10 manages transaction transcoding. In a preferred embodiment, the transcoding system 10 dynamically builds an XML tree that corresponds to a transaction schema as a user proceeds from one step of the transaction to the next. For example, when a user requests to make a bid for an item on an on-line auction site, the system 10 downloads the auction-site page that contains a search-box. The transcoder 24 transcodes the data using a PatML rule that matches the site's page, into an XML fragment that conforms to the search-fragment in a select-item transaction. This fragment contains the information needed for the system to construct a search request, which includes the auction URL and the query syntax for the specific site. The user enters a query thorough the client device 12, and the system 10 modifies the XML search fragment to include this input. The system 10 then sends this fragment to the generator 26, which uses the input and search-query information to download an item-list page from the auction-site server. Based on the select-item transaction schema, the system 10 retrieves the next transcoding rule (the item-list rule) and applies it to the document. The result is an item-list XML fragment. The system 10 appends this fragment of the XML search fragment and returns the new member of the tree to be rendered. Each item in this list contains information—the URL—that links to the item-page. When the user selects one of these items, the system 10 generates a new XML fragment that corresponds to the next transaction schema, the make-bid schema.

FIG. 5 is a flow chart that shows a method for transcoding web data in accordance with a preferred embodiment of the invention. Initially, a user inputs a request through a client device 12. At block 50, the particular adapter 22 that corresponds to this client device 12 receives the request. This adapter 22 maps the node to an XML tree that represents the transaction in progress, at block 52. For example, the user might input a search inquiry through an HTTP request and the adapter 22 that rendered the page will map this request to the XML search fragment. At decision block 54, the presence of the user query will direct the process to block 56 where the adapter 22 modifies the XML fragment by adding the user input to it. For example, the user input may be added as an attribute of the XML fragment.

The generator 26 receives the XML search fragment as the system request. According to the transaction schema, it must next construct an item-list fragment as the child of the search fragment. If the node does not already exist, the system downloads the page. If the node already exists, the system returns to the mapped node, as shown in block 69. Hence, the generator 26 recognizes, in block 58, that the request requires it to download a web page from the auction site, as shown in block 60.

The transcoder 24 receives the downloaded page along with the transaction XML tree. Based on the transaction schema, the transcoder 24 recognizes that the downloaded page contains an item-list, which is the content that it expects next. The transcoder 24 thus retrieves the item-list transcoding rule from a repository for the transaction instance, as shown in block 62. The transcoder 24 applies the rule to create the new XML node, in block 64, and appends the node to the tree, in block 66. Finally, the transcoder 24 transmits the new node, in block 68. The adapter 22 then adapts the node for the client device 12, in blocks 70 and 72.

FIG. 6 shows a link node data structure used in a preferred embodiment of the invention. The link node is the precursor of a fully formed XML node specified by the transaction schema. The link node acts as a placeholder for the fully formed node that will be constructed from the data in the downloaded page. FIG. 6 shows three link nodes: description, statistics, and input-bid nodes. Each node specifies a URL for the web page that contains the data for the future node and a Uniform Resource Identifier (URI) for a rule that will transform the page. The generator 26 and transcoder 24 process these nodes by downloading the referenced page and applying the referenced rule to the page. The result is a new XML node (for each link-node) that replaces the precursor link-node.

In a preferred embodiment of the invention, the transcoding system 10 uses the request URL to identify the appropriate adapter 22 to use. Each adapter 22 is specialized for a particular client agent. Based on the transaction schemas, the adapter transcodes the XML fragments for rendering by each specific user agent. One type of adapter 22 may process the XML fragments for rendering by each specific user agent. One type of adapter 22 may process the XML fragment by applying PatML or XML Style Sheet Language Transformation (XSLT) transcoding rules. Another type of adapter might use Extensible Style Sheet Language (XSL) style-sheets (a style sheet format for XML documents) to process the XML.

While the particular SYSTEM AND METHOD FOR TRANSCODING WEB CONTENT FOR DISPLAY BY ALTERNATIVE CLIENT DEVICES as herein shown and described in detail is fully capable of attaining the above-described objects of the invention, it is to be understood that it includes the presently preferred embodiments of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or "steps for".

We claim:

1. A computer-implemented method for processing a transaction between a client device and a web site comprising:
    configuring at least one adapter to interface with the client device;
    defining a plurality of web page transactional service domains, and defining at least one transcoding rule relating to each transactional service domain;
    interpreting a request from the client device;
    receiving a web page specified by the request, the web page enabling transactions in one of the transactional service domains;
    retrieving at least the previously defined transcoding rule that corresponds to the transactional service domain of the web page; and
    extracting data from the web page using the retrieved rule;
    wherein the step of interpreting the request includes the step of using an adapter configured for the client device to interpret the request, and further including the step of selecting from among a plurality of adapters to perform the interpreting.

2. The method of claim 1, further comprising translating the interpreted request into a system request.

3. The method of claim 1, wherein the client request is an HTTP request.

4. The method of claim 1, wherein the HTTP request includes the URL of a web page.

5. The method of claim 1 wherein the client device is a hand held device and the step of selecting includes the step of selecting an adapter that is configured to interface with the hand held device.

6. The method of claim 5 wherein the hand held device is a wireless device.

7. The method of claim 1 wherein the HTTP request includes a URL that identifies which of the adapters to use.

8. The method of claim 2 wherein the step of translating the client request into a system request includes translating the client request into an XML fragment within an XML document.

9. The method of claim 1 further comprising:
    transforming the extracted data into a standard form;
    modifying the standard form of the extracted data to enable its display by the client device; and
    receiving and displaying the modified data using the client device.

10. The method of claim 9 wherein the step of transforming the web page data into a standard form includes transforming the web page data into an XML document.

11. A system for processing transactions between a client device and a web page comprising:
    an adapter for receiving and interpreting a request from the client device, the adapter being configured to interface with the client device;
    a generator for retrieving a web page specified by the request;
    a transcoder for receiving the retrieved web page, for applying a transcoding rule to extract data from the web page, and for transforming the data into a standardized form, the transcoding rule being one of a set of predefined rules relating a service domain embodied by the web page; and
    an adapter for modifying the standardized data into a compatible form for display by the client device.

12. The system of claim 11, wherein the generator translates the interpreted request into a system request.

13. The system of claim 11, wherein the client request is an HTTP request.

14. The system of claim 13 wherein the HTTP request includes the URL of a web page.

15. The system of claim 11 further including a plurality of adapters each configured to interact with a particular client device.

16. The system of claim 11 wherein the client device is a hand held device and one of the adapters is configured to interface with a hand held device.

17. The system of claim 16 wherein the hand held device is a wireless device and one of the adapters is configured to interface with a wireless device.

18. The system of claim 13 wherein the HTTP request includes a URL that identifies which of the adapters to use.

19. The system of claim 13 wherein the adapter further translates the client request into an XML fragment within an XML document.

20. The system of claim 11 wherein the transcoder transforms the web page data into a standard form that is an XML document.

21. A computer program product, comprising:
 a computer program storage device;
 computer-readable instructions on the storage device for causing a computer to undertake method acts to facilitate the processing of transactions between a client device and a web site, the method acts comprising:
 configuring at least one adapter to interface with the client device;
 defining a plurality of web page transactional service domains, defining steps performed by transactions in each transactional service domain, and defining a set of transcoding rules relating to each transactional service domain;
 interpreting a request from the client device;
 receiving a web page specified by the request, the web page enabling transactions in one of the transactional service domains;
 retrieving at least one previously defined transcoding rule that corresponds to the transactional service domain of the web page;
 extracting data from the web page using the retrieved rule:
 transforming the extracted data into a standard form;
 modifying the standard form of the extracted data to enable its display by the client device; and
 receving and displaying the modified data using the client devive.

\* \* \* \* \*